June 4, 1935.  D. L. LOTTS  2,003,833
FREEWHEELING CLUTCH
Filed Oct. 19, 1931  3 Sheets-Sheet 1

Inventor:
Delbert L. Lotts.
By Wallace R. Lane
Atty.

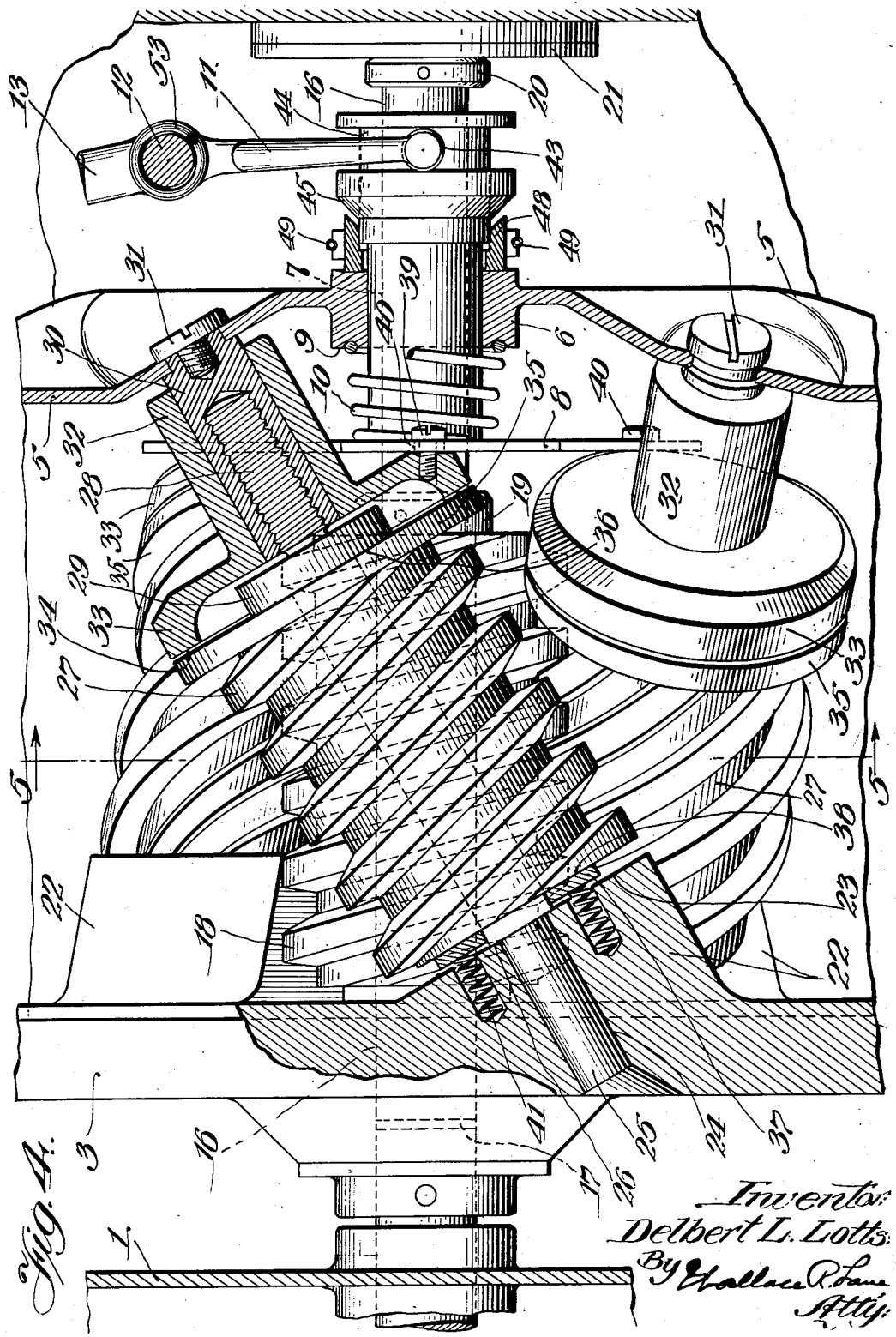

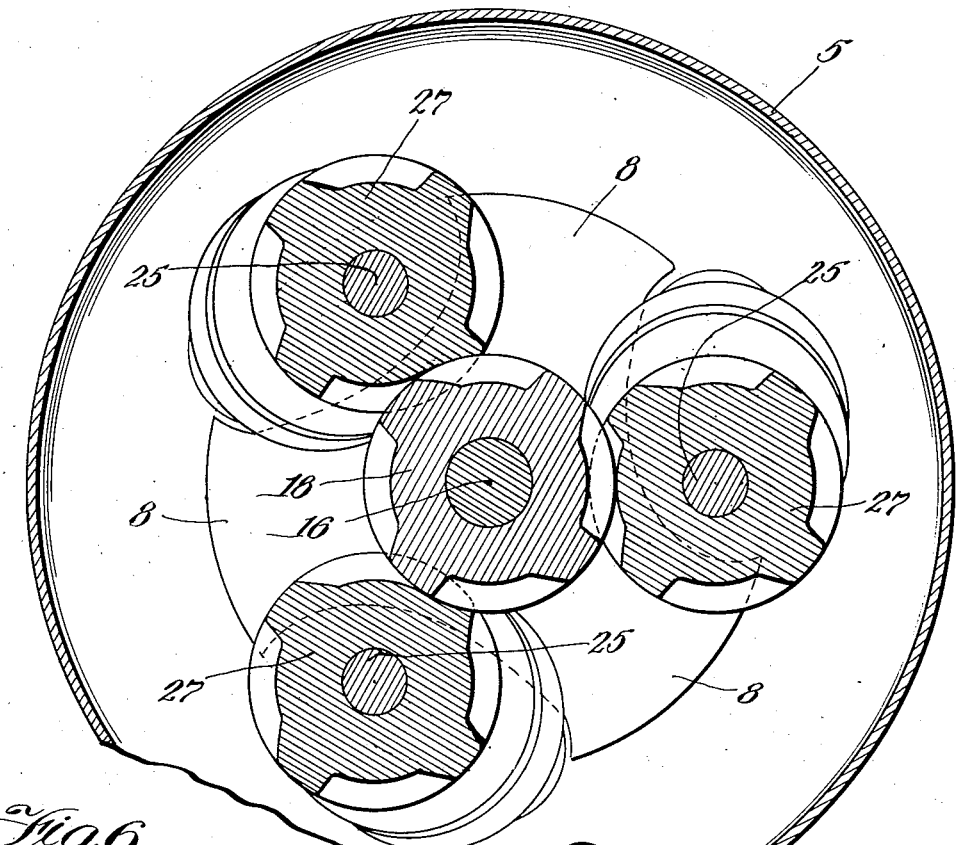
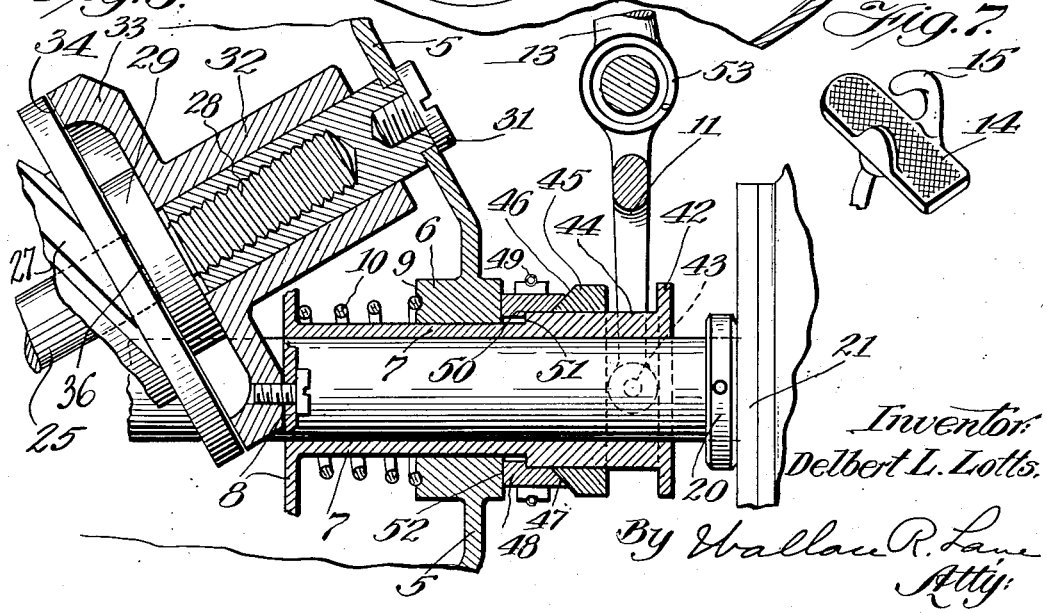

Patented June 4, 1935

2,003,833

UNITED STATES PATENT OFFICE 2,003,833

FREE WHEELING CLUTCH

Delbert L. Lotts, Chicago, Ill., assignor, by direct and mesne assignments, to General Research Corporation, Chicago, Ill., a corporation Application October 19, 1931, Serial No. 569,620

24 Claims. (Cl. 192—48)

This invention relates to clutches and more particularly to that type of clutch called a free wheeling clutch in which the driven shaft when clutched will be driven by the driving shaft, but when the speed of the driven shaft exceeds that of the driving shaft it will run free of the engine. While this clutch is especially adapted for use on automobiles I wish it understood that the same is susceptible of use in any connection where its function is desired and its structure is usable.

Among the objects of my invention is to provide a novel construction of free wheeling clutch.

A further object is to provide a clutch of the type referred to in which the structure is reliable, efficient and strong.

A still further object is the adaptation of worms in a clutch of the type referred to, thus saving space and eliminating the necessity of large gear wheels, as well as increasing the efficiency of the clutch.

Another object is to provide novel means for controlling the operation of the clutch worms.

A further object is the provision of locking means for locking a control lever and controlling parts associated with the clutch worms in the free wheeling position, but also permitting the same to be moved to a position with the clutch thrown out of driving engagement and also to a position with the clutch thrown in driving position, but in the latter instance not free wheeling.

Another object is to provide one or more driving worms arranged in a planetary manner around the circumference of a driven worm, the teeth of the driving worms and the teeth of the driven worm being constructed on such an angle that when sufficient braking friction is applied to the driving worms their teeth will lock with the teeth of the driven worm and bodily rotate the same and when said friction is reduced to a sufficiently small amount the teeth of the driving worms will idly slide between the teeth of the driven worm without bodily rotating the same.

Still a further object is to position the shaft of each of the driving worms at a satisfactory angle to enable the operation referred to above.

Another object is to provide novel means for applying friction to each of the driving worms at times in large amount and at other times in smaller amount to hold the driving worms against rotation when performing their driving function, or to permit them to rotate when not performing their driving function.

A further object is to provide a slight longitudinal movement of each of the driving worms so that when performing their free wheeling function each of the driving worms will be moved a slight distance longitudinally in one direction after the application of considerable friction thereto when driving the driven worm and to move a slight longitudinal distance in the opposite direction to relieve the large friction and apply a small friction when the driven worm is rotating faster than the drive shaft.

Still a further object is to provide resilient means normally urging each of the driving worms in one direction, but retractable when it is necessary for the driving worms to move a slight longitudinal distance in a direction away from the larger friction means, thus resiliently holding the driving worms against undue looseness and causing them to float in a controllable manner.

Another object is to provide means for longitudinally adjusting the position of application of the smaller friction referred to.

Still another object is to adapt my improved clutch for operation by a clutch pedal of an automobile and provide such pedal with means to enable it to be moved upwardly by the foot when desired.

Further objects, advantages and capabilities will later more fully appear.

My invention further resides in the combination, construction and arrangement of parts illustrated in the accompanying drawings and while I have shown therein a preferred embodiment I wish it understood that the same is susceptible to modification and change without departing from the spirit of my invention.

In the drawings:

Fig. 4 is a side elevation of my improved clutch with parts shown in section for the sake of clearness.

Fig. 5 is a vertical section taken on the line 5—5 of Fig. 4.

Fig. 6 is a view similar to Fig. 2, but showing the shifting sleeve in vertical section and the parts in position for free wheeling.

Fig. 7 is a perspective detail of the foot pedal showing the means to enable the foot pedal to be moved upwardly with the foot as well as downwardly.

Figure 1:
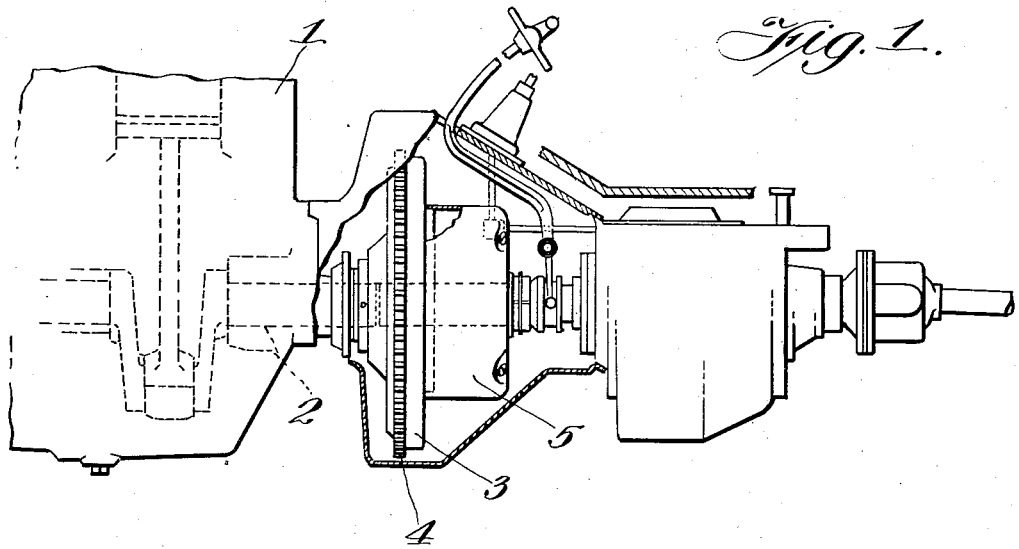
Fig. 1 is a side elevation, partly in section of my improved clutch applied to automobile mechanism, only a portion of the most closely associated parts of the automobile being shown for the sake of convenience.

Referring more in detail to the drawings Fig. 1 shows in conventional form, an internal combustion engine 1 of an automobile, the drive shaft 2 of which has keyed, pinned or otherwise fixed thereto, a fly-wheel or disc 3 carrying the spur gear 4 for the starting mechanism. Fixed to one side face of the fly-wheel is the clutch casing 5 adapted to contain grease or oil in which the clutch runs and also provide a supporting means for certain of the parts, as more fully hereinafter set forth.

Referring more particularly to Fig. 4 the casing 5 is seen to be provided at its right hand end with a bearing 6 for slidably receiving the shifting sleeve 7 which, at its left hand end, has fixed thereto the shifter plate 8, there being provided between the face 9 of said bearing and the inner face of the shifter plate a coil spring 10 of sufficient strength to move the shifter plate and associate parts to the left when the operating lever 11 is moved to the left at its lower end. When the operating lever is moved at its lower end to the right, this moves the shifting sleeve 7 longitudinally to the right as viewed in Fig. 4, thus storing up energy in spring 10. Operating lever 11 is the lower end of a foot pedal lever of an automobile fulcrumed at 12 and whose upper portion 13 is provided with the usual foot pedal 14 shown in Fig. 7. This pedal is provided with an upwardly and inwardly extending member 15 under which the toe or other portion of the foot is adapted to engage to enable the foot pedal when desired to be moved upwardly as well as forced downwardly.

Suitably journalled in the fly-wheel 3 for rotation therein, is the driven shaft 16 which extends to the rear portion of the automobile for operating the drive wheels through the differential or other driving means not shown, but well understood. Drive shaft 2 and driven shaft 16 are separated from each other as shown at 17 in Fig. 4 so that each may rotate independently of the other when required. Keyed or otherwise suitably secured to the driven shaft 16 for rotation therewith, is a worm 18 whose teeth are formed at such an angle that when power is applied to the fly-wheel only a small amount of friction against the ends of the driving worms hereinafter described, will be necessary to control the operation of the clutch.

A thrust collar 19 is fixed to driven shaft 16 at the end of the worm 18 to prevent longitudinal movement of said worm. Another thrust collar 20 is fixed to the shaft 16 to abut against a suitable portion 21 (or other part, as desired) to prevent longitudinal movement of shaft 16.

Fly-wheel 3 is formed, at suitably spaced distances (there being three in the structure illustrated in the drawings), with lugs 22 formed with the plane angle face 23. Lug 22 is also provided with a cylindrical opening 24 to receive the end of shaft 25, which shaft is provided with an offset 26 to hold it in proper position relative to lug 22. Rotatably mounted on shaft 25 is worm 27, said shaft and worm standing at such an angle that its teeth properly engage the teeth of the driven worm 18. Shaft 25 extends entirely through and beyond the end of worm 27, its projecting end 28 being screw threaded to permit a fine adjustment of the small friction element 29. The hollow stub shaft 30 is formed on its interior with screw threads to properly engage the threads on extension 28. By rotating friction element 29 it will be correspondingly moved a slight distance toward or away from worm 27 depending upon the direction of rotation and will then be locked by any suitable means. Threaded extension 28 is threaded in the stationary stub shaft 30 which in turn is fixed to the wall of casing 5 by a clamping screw 31 as clearly shown in Fig. 4.

Mounted for longitudinal sliding movement on stub shaft 30 is sleeve member 32 which, at its lower end, is flared outwardly into a bell shaped portion 33 provided on its lower face with a plane friction surface 34. Formed on the upper end of worm 27 is a flange 35 also having a plane face adapted to frictionally engage face 34 when these two faces are brought into engagement. This enlarged portion 33 and friction face 34 are, in this specification, jointly referred to as the large friction element, and the element 29 with its plane face 36 is referred to as the small friction element at one end of the driving worm, and the element 37 with its plane face 38 the small friction element at the other end of the driving worm.

In the structure illustrated in the drawings there are provided for illustrative purposes only, three of these angularly positioned shafts 25 and driving worms 27 with their associate parts, but for the sake of convenience only one of them has been described in detail. It is to be understood that they are all three alike, and equally spaced around the circumference of the driven worm 18.

The enlarged portion 33 of sleeve 32, which has been earlier described as being longitudinally slidable on stub shaft 30, is attached to shifting plate 8 by means of suitable set screws 39 or the like which pass through openings 40 in shifting plate 8 which openings are made slightly larger than the diameter of the set screws 39 to compensate for the angular movement of sleeve 32. As will be readily understood a longitudinal shifting of sleeve 7 will effect a corresponding longitudinal movement of sleeve 32 and thus move friction face 34 toward or away from the adjacent face of flange 35 on the end of driving worm 27.

Mounted in suitable openings in lugs 22 are springs 41 which bear against friction ring 37 which in turn, under the action of these springs, urges the driving worm 27 upwardly for a purpose to be hereinafter more fully set forth.

Figure 2:
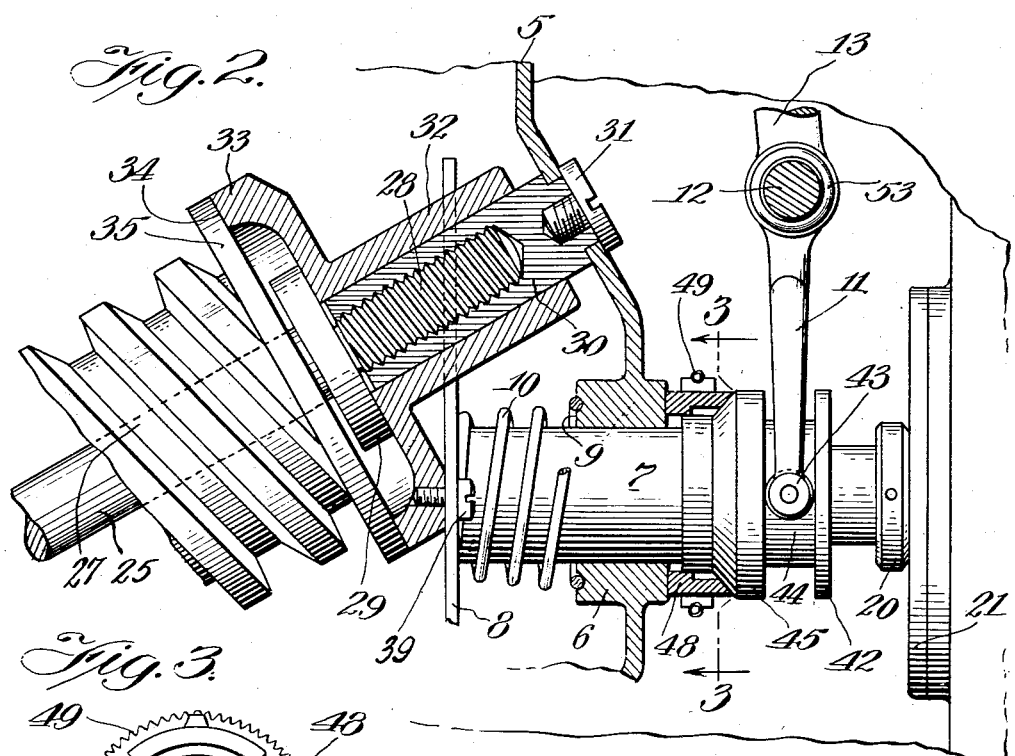
Fig. 2 is a fragmentary sectional view of the control means for applying or releasing the larger friction to the end of a driving worm, the adjacent end of the driving worm being shown in elevation and the parts shown in the position which they occupy when the clutch is in driving engagement with the driving parts.
Figure 3:
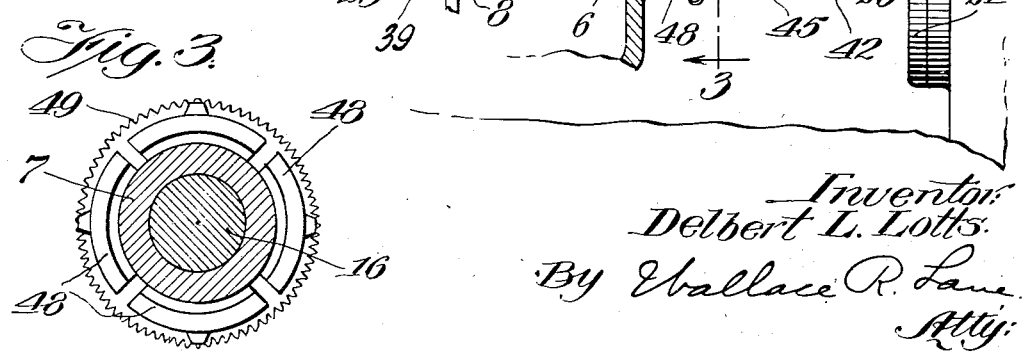
Fig. 3 is a transverse section of the locking means for releasably locking the controlling parts in free wheeling position, said section being on line 3—3 of Fig. 2.

Shifting sleeve 7, as seen in Figs. 2, 4 and 6, is provided at its rear end with a circular flange 42 which abuts against the roller 43 on the bottom of lever 11 and thus holds sleeve 7 against movement to the left under action of spring 10 except when roller 43 is moved to the left by lever 11. Slidable on enlarged portion 44 of shifting sleeve 7 is a short sleeve 45 which is provided on its forward face with inclined surface 46 engaging the corresponding inclined face 47 of expansible ring 48. This ring as seen in Fig. 3, is made expansible by reason of its being formed in several segments suitably spaced apart at their ends and urged inwardly against sleeve 7 by a coil spring 49 which is secured circumferentially therearound. When sleeve or collar 45, as viewed in Fig. 6, is moved to the left by lever 11 its inclined face 46 will cause inclined face 47 to ride outwardly thereon and open up the expansible member 48 and cause shoulder 50 to move outwardly to clear shoulder 51, thus enabling sleeve 7 to move further to the left. When shoulder 50 is in engagement with shoulder 51 and also in engagement with face 52 of bearing 6 they will hold sleeve 7 from movement to the left.

The operation of my clutch is as follows:

As pointed out above, the angle of inclination of the worm teeth is such that when a small friction is applied to the end of the driving worms the teeth of the driving worms will idly slide through the space between the teeth of the driven worm without rotating the latter, but when a larger friction is applied to the end of each of the driving worms the teeth of the driving worms will lock with the teeth of the driven worm and cause the driven worm to rotate bodily with the driving worms and the fly-wheel. In other words, on the application of a small friction the driven shaft is not rotated by the driving shaft but such rotation is effected upon the application of a larger friction to the ends of the driving worms.

The application of the small or large friction to the ends of the driving worms is effected by movement of the foot pedal 14. When this foot pedal is pushed down to its lowest position lever 11 will be moved rearwardly effecting a corresponding movement of sleeve 7 by reason of engagement of roller 43 with flange 42 (see Fig. 6). This movement to the right of sleeve 7 will, through shifter plate 8, move sleeve 32 upwardly (to the right) thus moving friction face 34 away from the adjacent face of flange 35 on the end of driving worm 27 such a distance that before the face of flange 35 can contact with friction face 34 it will contact with face 36 of the small friction element 29. This small friction element is of a diameter small enough that the friction created between the same and the face of flange 35 is not sufficiently great to lock the teeth of the worm wheels, but will permit them to idle with relation to each other. In the illustration in the drawings the fly-wheel rotates clockwise when viewed from the left in Fig. 4. This, as will be understood, means that when the clutch is driving the driven worm and driven shaft the driving worms 27, due to their slight longitudinal movement on their shafts, will be urged to the right, thus bringing flange 35 into engagement with the small friction element 29 under the conditions just referred to above. The conditions just referred to are those present when the clutch is out of driving engagement. Under these conditions, as explained above, the driving worms 27 will be idling with relation to the driven worm 18.

Now, assuming the foot pedal to be raised under the action of coil spring 53, this will move lever arm 11 to the left in Fig. 6, which will permit flange 42 to follow roller 43 to the left under action of spring 10 until shoulder 51 strikes shoulder 50 on the expansible ring 48 which will stop further movement of sleeve 7. This will move sleeve 32 to the left until friction face 34 has moved a very slight distance in advance of the left-hand face of small friction element 29 as viewed in Fig. 2. This advance must be very slight and it would be permissible that friction face 34 be in exact alignment with said left-hand face of element 29, but it is essential that face 34 not be, even the slightest distance, back of same. The parts will be locked in this position by contact between shoulders 50 and 51 and the action of the clutch will be as follows:

The condition just described is that under which free wheeling takes place and, as pointed out above, by free wheeling is meant that when the drive shaft rotates faster than the driven shaft the clutch will drive the driven shaft, but when the speed of the driven shaft exceeds the speed of the driving shaft the driven shaft will rotate free from any substantial resistance by the clutch. This is effected by the slight longitudinal movement of the driving worms on their respective shafts.

Assuming the driving shaft and fly-wheel to be rotating faster than the driven shaft, and keeping in mind that the fly-wheel, when viewed from the left, rotates in a clockwise direction, the force exerted between the teeth of the driving worms and the driven worm will be such as to move the driving worms longitudinally slightly to the right. This will cause face 36 of flange 35 (which is integral or fixed to the driving worms) to have frictional contact with face 34 of element 33. This friction being great enough to prevent sliding of the teeth of driving worms 27 in the teeth of driven worm 18, these parts will be locked together and cause driven worm 18 to drive the driven shaft 16. However, when the speed of the driven shaft exceeds that of the driving shaft the pressure between the teeth of the driven worm 18 and the driving worms 27 will be such as to cause a slight longitudinal movement of the driving worms to the left which will cause the left end of the same to contact with the small friction face 38 of friction element 37 which friction, as in the case of friction element 29 described above, is small enough to permit the teeth of driving worms 27 to idly slide in the space between the teeth of the driven worm 18 thus permitting the driving worms to idle on the driven worm and prevent locking of the worms together. As will be readily apparent, this permits the driven shaft to run faster than the driving shaft and at the same time substantially free from the clutch except for the sliding friction between the teeth of the worms.

When it is desired to throw the clutch into conventional clutch or driving engagement so that the clutch will be in driving engagement at all times, all that is necessary is to pull upwardly on pedal 14 by hooking the toe of the operator under projection 15 and pulling upwardly. This will force lever 11 further to the left and drive the beveled face 46 of sleeve 45 under the beveled face 47 of expansible ring 48, thus causing the expansible ring to open and shoulder 50 to move outwardly to be free from shoulder 51, thus permitting sleeve 7 to move further to the left and placing the larger friction element 33 into the position shown in Fig. 2. In this position the friction face 34 is moved a considerable distance in advance of friction face 36 of element 29, so that regardless of direction of rotation of the driven worm in going forward or backing up, large friction face 34 always contacts the face of flange 35 and locks the driving worms with the driven worm so that the clutch is at all times in driving engagement.

It is thus seen that I have provided a novel form of clutch in which, when the foot pedal of an automobile (or other controlling lever) is pushed to its lowermost position, the clutch is disengaged and the engine can run free without driving the driven shaft. When the foot pedal is moved upwardly until stopped by shoulders

50 and 51 the clutch will be in engagement when the speed of the driving shaft exceeds that of the driven shaft and out of driving engagement when the speed of the driven shaft exceeds that of the driving shaft.

When the foot pedal is forcibly caused to move upwardly an additional distance the clutch is then in conventional driving engagement. Free wheeling is thus provided for as well as the normal operations necessary in a clutch in automobile or other practice.

It is clearly understood that in the device as described either element may be the driving element. That is, power may be applied to what has been termed the driven element, thus making it the driving element, without changing the operation of the device.

The angle of the teeth on each of the driving and driven worms is preferably approximately fifteen degrees, but such other angles may be used as will accomplish the results of this invention. Between the angles of twelve and twenty-three degrees might be considered good working limits.

Having thus described my invention, I claim:

1. In a free wheeling clutch, a driving shaft, a driven shaft, a disc secured to said drive shaft to rotate therewith, a worm fixed on said driven shaft adjacent said disc, a shaft projecting angularly from said disc, a worm on said angular shaft and meshing with the first mentioned worm, and means to cause the worm on the angular shaft to lock with the worm on the driven shaft and rotate the same or rotate idly with relation thereto as desired.

2. In a free wheeling clutch, a driving shaft, a driven shaft, a laterally extending member secured to said drive shaft to rotate therewith, a worm fixed on said driven shaft, a worm rotatably mounted on said member at an acute angle thereto and meshing with the worm on the driven shaft, and means to selectively cause the worm on the said member to rotate the driven shaft worm or idly turn with relation thereto as desired.

3. In a free wheeling clutch, a driving shaft, a driven shaft, a worm fixed to the driven shaft, a plurality of worms carried upon the driving shaft at an acute angle with relation to the driven shaft and each meshing with the worm on the driven shaft, and means to selectively cause each of the worms carried upon the driving shaft to lock with the worm on the driven shaft or idle thereon as desired.

4. In a free wheeling clutch, a driving shaft, a driven shaft, a worm fixed to the driven shaft, a plurality of worms carried upon the driving shaft and each meshing with the worm on the driven shaft, and means to selectively cause each of the worms carried upon the driving shaft to lock with the worm on the driven shaft or idle thereon as desired, each of said plurality of worms being mounted on a shaft positioned at an acute angle to the driven shaft.

5. In a free wheeling clutch, a driving shaft, a driven shaft, a worm fixed on said driven shaft, a worm associated with the driving shaft and meshing with the first mentioned worm, means to selectively cause said worms to lock relatively to each other or idly rotate, a laterally extending plate fixed to said driving shaft, said second mentioned worm being mounted at an acute angle on said plate.

6. In a free wheeling cluch, a driving shaft, a driven shaft, a worm fixed to the driven shaft, a plurality of worms carried upon the driving shaft and each meshing with the worm on the driven shaft, and means to selectively cause each of the worms carried upon the driving shaft to lock with the worm on the driven shaft or idle thereon as desired, each of said plurality of worms being mounted on a shaft positioned at an acute angle with relation to the driven shaft, a laterally extending plate fixed to the driving shaft, each of said angular shafts being carried by said plate.

7. In a free wheeling clutch, a driving shaft, a driven shaft, a worm associated with said driven shaft, a worm associated with the driving shaft and meshing with the first mentioned worm, and means to selectively cause said worms to lock relatively to each other or idly rotate, said means comprising a bearing surface of small diameter and a bearing surface of large diameter and actuating means to selectively cause said large diameter bearing surface to bear against the end of the second mentioned worm to lock the two worms with relation to each other, and to cause the small diameter bearing surface to alone bear against the end of the second mentioned worm to permit the two worms to idly rotate.

8. In a free wheeling clutch, a driving shaft, a driven shaft, a worm associated with said driven shaft, a worm associated with the driving shaft and meshing with the first mentioned worm, and means to selectively cause said worms to lock relatively to each other or idly rotate, said means comprising a bearing surface of small diameter and a bearing surface of large diameter and actuating means to selectively cause said large diameter bearing surface to bear against the end of the second mentioned worm to lock the two worms with relation to each other, and to cause the small diameter bearing surface to alone bear against the end of the second mentioned worm to permit the two worms to idly rotate, and a foot pedal for operating said actuating means.

9. In a free wheeling clutch, a driving shaft, a driven shaft, a worm fixed on said driven shaft, a worm associated with the driving shaft and meshing with the first mentioned worm, and means to selectively cause said worms to lock relatively to each other or idly rotate, said means comprising a bearing surface of small diameter and a bearing surface of large diameter and actuating means to selectively cause said large diameter bearing surface to bear against the end of the second mentioned worm to lock the two worms with relation to each other, and to cause the small diameter bearing surface to alone bear against the end of the second mentioned worm to permit the two worms to idly rotate, and a foot pedal for operating said actuating means, said actuating means comprising a sleeve slidable on the driven shaft, and a shifter plate carried by the sleeve and secured to the large diameter bearing surface element.

10. In free wheeling clutch mechanism, a driving shaft, a driven shaft, a worm fixed to rotate with the driven shaft, a worm carried by the driving shaft to rotate around the first mentioned worm and mesh therewith, a small diameter bearing surface at each end of the second mentioned worm, a large diameter bearing surface at one end of the same, and means to selectively cause said large diameter bearing surface to bear against the end of the second mentioned worm to cause said two worms to lock together to drive the driven shaft, and cause the large diameter bearing surface to be free of contact with the worm end to permit free wheeling when the speed of the driven shaft exceeds that of the driving shaft.

11. In free wheeling clutch mechanism, a driving shaft, a driven shaft, a worm fixed to rotate with the driven shaft, a worm carried by the driving shaft to rotate around the first mentioned worm and mesh therewith, a small diameter bearing surface at each end of the second mentioned worm, a large diameter bearing surface at one end of the same, and means to selectively cause said large diameter bearing surface to bear against the end of the second mentioned worm to cause said two worms to lock together to drive the driven shaft, and cause the large diameter bearing surface to be free of contact with the worm end to permit free wheeling when the speed of the driven shaft exceeds that of the driving shaft, said means comprising a slight longitudinal shifting of the second mentioned worm against the large diameter bearing surface when the driving shaft and worms are driving the driven shaft, and away from the large diameter surface when the driven shaft rotates faster than the driving shaft.

12. In free wheeling clutch mechanism, a driving shaft, a driven shaft, a worm fixed to rotate with the driven shaft, a worm carried by the driving shaft to rotate around the first mentioned worm and mesh therewith, a small diameter bearing surface at each end of the second mentioned worm, a large diameter bearing surface at one end of the same, and means to selectively cause said large diameter bearing surface to bear against the end of the second mentioned worm to cause said two worms to lock together to drive the driven shaft, and cause the large diameter bearing surface to be free of contact with the worm end to permit free wheeling when the speed of the driven shaft exceeds that of the driving shaft, said means comprising a slight longitudinal shifting of the second mentioned worm against the large diameter bearing surface when the driving shaft and worms are driving the driven shaft, and away from the large diameter surface when the driven shaft rotates faster than the driving shaft, and lever controlled means to set the large bearing surface into position for the action recited.

13. In free wheeling clutch mechanism, a driving shaft, a driven shaft, a worm fixed to rotate with the driven shaft, a worm carried by the driving shaft to rotate around the first mentioned worm and mesh therewith, a small diameter bearing surface at each end of the second mentioned worm, a large diameter bearing surface at one end of the same, and means to selectively cause said large diameter bearing surface to bear against the end of the second mentioned worm to cause said two worms to lock together to drive the driven shaft, and cause the large diameter bearing surface to be free of contact with the worm end to permit free wheeling when the speed of the driven shaft exceeds that of the driving shaft, said means comprising a slight longitudinal shifting of the second mentioned worm against the large diameter bearing surface when the driving shaft and worms are driving the driven shaft, and away from the large diameter surface when the driven shaft rotates faster than the driving shaft, and lever controlled means to set the large bearing surface into position for the action recited, and means to releasably lock the large bearing surface in said position.

14. In free wheeling clutch mechanism, a driving shaft, a driven shaft, a worm fixed to rotate with the driven shaft, a worm carried by the driving shaft to rotate around the first mentioned worm and mesh therewith, a small diameter bearing surface at each end of the second mentioned worm, a large diameter bearing surface at one end of the same, and means to selectively cause said large diameter bearing surface to bear against the end of the second mentioned worm to cause said two worms to lock together to drive the driven shaft, and cause the large diameter bearing surface to be free of contact with the worm end to permit free wheeling when the speed of the driven shaft exceeds that of the driving shaft, said means comprising a slight longitudinal shifting of the second mentioned worm against the large diameter bearing surface when the driving shaft and worms are driving the driven shaft, and away from the large diameter surface when the driven shaft rotates faster than the driving shaft, and lever controlled means to set the large bearing surface into position for the action recited, said lever being movable to a position to throw said large bearing surface continuously against the end of the second mentioned worm to continuously lock the two worms together in driving relation, and movable to another position to keep the large bearing surface continuously away from said end so that said worms may continuously idle.

15. In free wheeling clutch mechanism, a driving shaft, a driven shaft, a first worm fixed on said driven shaft, a disc secured to the driving shaft to rotate therewith, a plurality of shafts each extending at an angle from the disc, a worm rotatably mounted on each of said angular shafts and meshing with said first worm, a large bearing surface for the end of each angularly positioned worm, a small bearing surface for each of said ends, and means for so positioning the said two bearing surfaces with relation to each other that shifting of the angular worms longitudinally in one direction will cause the angular worms to lock with said first worm, and in the other direction will cause them to idle thereon.

16. In free wheeling clutch mechanism, a shaft, a worm fixed thereon, a set of worms positioned circumferentially therearound and meshing therewith, means to cause the set of worms to selectively lock with the first mentioned worm or idle thereon as desired, each of the worms of said set of worms being positioned at an acute angle with relation to said shaft.

17. In free wheeling clutch mechanism, a shaft, a worm fixed thereon, a set of worms positioned circumferentially therearound and meshing therewith, means to cause the set of worms to selectively lock with the first mentioned worm or idle thereon as desired, each of the worms of said set of worms being positioned at an acute angle with relation to said shaft, and lever controlled means for controlling said selective movements.

18. In free wheeling clutch mechanism, a shaft, a worm fixed thereon, a set of worms positioned circumferentially therearound and meshing therewith, means to cause the set of worms to selectively lock with the first mentioned worm or idle thereon as desired, and lever controlled means for controlling said selective movements, said lever being movable to one position to permit said idling of the worms, to another position to permit said locking of the worms, and to another position to permit locking when the set of worms are driving the first worm and idling when the first worm is rotating faster than the movement of the set of worms around the first worm.

19. In free wheeling clutch mechanism, cooperating worms, controlling means for causing said worms to free wheel or drive, said means comprising a lever and shiftable sleeve, and an expansible collar on said sleeve to releasably lock the parts in free wheeling position.

20. In a free wheeling clutch, a driving shaft, a driven shaft, a driven worm fixed to said driven shaft, a driving worm associated with said driving shaft and meshing with said driven worm, a friction surface for selective engagement with said driving worm, and spring means normally urging the driving worm toward said friction surface.

21. In a free wheeling clutch, a driving worm, a driven worm, a movable large friction element and a stationary small friction element adapted to engage said driving worm, and adjusting means for adjusting the stationary small friction element toward or away from the driving worm.

22. In a free wheeling clutch, a driven shaft, a driven worm fixed to said driven shaft, a driving shaft, a driving worm associated with the driving shaft and meshing with the driven worm, means for selectively causing said two worms to lock so that the driving worm bodily drives the driven worm, or causing the driving worm to idle on the driven worm, control means for effecting said selective movements, and a foot pedal connected to said control means so that when the foot pedal is down the clutch parts will be out of driving engagement, when the foot pedal is part way up free wheeling action may occur, and when the foot pedal is all the way up the clutch parts will be in driving engagement.

23. In a clutch of the character set forth, a driving shaft, a driven shaft, a worm associated with said driven shaft, a worm associated with the driving shaft and meshing with the first mentioned worm, means to selectively cause said worms to lock relatively to each other or idly rotate, the inclination and hand of the teeth of said worms being alike and between the limits of twelve and twenty-three degrees.

24. In a free wheeling clutch, a driving shaft, a driven shaft, a worm associated with said driven shaft, a worm associated with the driving shaft and meshing with the first mentioned worm, and means to selectively cause said worms to lock relatively to each other or idly rotate, the inclination and hand of the teeth of said two worms being the same.

DELBERT L. LOTTS.